(12) United States Patent
Cheng et al.

(10) Patent No.: US 12,603,732 B2
(45) Date of Patent: Apr. 14, 2026

(54) RESOURCE ALLOCATION FOR SIDELINK ON UNLICENSED SPECTRUM

(71) Applicant: MEDIATEK SINGAPORE PTE. LTD., Singapore (SG)

(72) Inventors: Jun-Qiang Cheng, Beijing (CN); Tao Chen, Beijing (CN); Jing-Wei Chen, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 150 days.

(21) Appl. No.: 18/345,644

(22) Filed: Jun. 30, 2023

(65) Prior Publication Data

US 2024/0007237 A1     Jan. 4, 2024

(30) Foreign Application Priority Data

Jul. 4, 2022     (WO) ................. PCT/CN2022/103729
Jun. 25, 2023     (CN) .......................... 202310754351.0

(51) Int. Cl.
  *H04W 4/00*          (2018.01)
  *H04L 5/00*          (2006.01)
  *H04W 72/25*         (2023.01)
(52) U.S. Cl.
  CPC ............ *H04L 5/001* (2013.01); *H04L 5/0094* (2013.01); *H04W 72/25* (2023.01)
(58) Field of Classification Search
  CPC ..... H04L 5/001; H04L 5/0094; H04L 5/0041; H04L 5/0044; H04L 5/0053; H04L 5/0042; H04W 72/25; H04W 76/14
  See application file for complete search history.

(56) References Cited

U.S. PATENT DOCUMENTS

| | | | | |
|---|---|---|---|---|
| 2023/0269730 A1* | 8/2023 | Sun | ................... | H04W 72/1263 |
| | | | | 370/329 |
| 2024/0023079 A1* | 1/2024 | Si | ........................... | H04W 72/02 |
| 2024/0306171 A1* | 9/2024 | Zhao | ................... | H04W 72/231 |

FOREIGN PATENT DOCUMENTS

| | | | |
|---|---|---|---|
| WO | WO 2022/073183 A1 | 4/2022 | |
| WO | WO-2024210229 A1 * | 10/2024 | ........... H04L 5/0044 |

OTHER PUBLICATIONS

C. Shin, E. Farag, H. Ryu, M. Zhou and Y. Kim, "Vehicle-to-Everything (V2X) Evolution From 4G to 5G in 3GPP: Focusing on Resource Allocation Aspects," in IEEE Access, vol. 11, pp. 18689-18703, 2023. (Year: 2023).*

(Continued)

*Primary Examiner* — Thai Dinh Hoang

(74) *Attorney, Agent, or Firm* — Helen Mao; Imperium Patent Works

(57)          ABSTRACT

A method can include determining a resource allocation framework for sidelink communication, allocating resources in a resource grid for PSCCH, PSSCH, or PSFCH based on the framework, and transmitting at least one sub-channel index and at least one RB set index to indicate resource allocation information of PSCCH, PSSCH, or PSFCH over an SL-U spectrum, wherein the resource allocation framework comprising at least one SL-U CC including an SL-U BWP including X indexed RBs, the SL-U BWP being divided into Y indexed RPs and at least one inter-RP GB when Y being an integer greater than 1, each RP being divided into N indexed RB sets and at least one intra-cell GB when N being an integer greater than 1, K indexed interlaces configured to map the RBs cyclically per BWP, and sub-channels configured to map the interlaces per RB set and cyclically across different RB set per RP.

20 Claims, 6 Drawing Sheets

(56)        References Cited

OTHER PUBLICATIONS

M. H. C. Garcia et al., "A Tutorial on 5G NR V2X Communications," in IEEE Communications Surveys & Tutorials, vol. 23, No. 3, pp. 1972-2026, 3rd quarter 2021. (Year: 2021).*
Extended European Search Report issued Nov. 8, 2023 in European Patent Application No. 23183031.6, 11 pages.
Moderator (Huawei), "FL summary#4 for AI 9.4.1.2 SL-U physical channel design framework," 3GPP TSG-RAN WG1 Meeting #109-e, May 9-20, 2022, 92 pages, XP052204065.

\* cited by examiner

100

| RB SET 105B | | | | | | INTRA-CELL GB (6) 106B | | | RB SET 105C | | | INTER-RP GB 104 | RP 103B | | | | | | RB SET 105D | | | |
|---|---|---|---|---|---|---|---|---|---|---|---|---|---|---|---|---|---|---|---|---|---|---|
| 58 | 59 | 60 | 61 | ... | 105 | 106 | ... | 110 | 111 | ... | 160 | 161 | ... | 166 | 167 | 168 | 169 | 170 | 171 | 172 | ... | 216 |
| 3 | 4 | 0 | 1 | ... | 0 | 1 | ... | 0 | 1 | ... | 0 | 1 | ... | 1 | 2 | 3 | 4 | 0 | 1 | 2 | ... | 1 |
| 3 | 4 | 0 | | | | | | | 1 | ... | 0 | | | | 0 | 1 | 2 | 3 | 4 | | | |

INTRA-CELL GB (6) 106C

UNAVAILABLE

FIG. 1 (CONT.)

RESOURCE ALLOCATION FOR SIDELINK ON UNLICENSED SPECTRUM

INCORPORATION BY REFERENCE

This present application claims the benefit of Chinese Application No. 202310754351.0, filed Jun. 25, 2023, which claims the benefit of International Application No. PCT/CN2022/103729, "Methods of resource allocation of SL on unlicensed spectrum" filed on Jul. 4, 2022, which is incorporated herein by reference in its entirety.

TECHNICAL FIELD

The present disclosure relates to wireless communication systems, and more particularly, to methods for resource allocation of sidelink (SL) operated on unlicensed spectrum.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Sidelink operated on unlicensed/shared spectrum (SL-U) is one of the most promising directions for SL evolution. However, considering the resource allocation frameworks in legacy NR unlicensed (NR-U) and SL are different, the design of resource allocation framework for SL-U will be a critical issue, and thus should be addressed as a fundamental premise to ensure that SL can be operated on unlicensed/shared spectrum.

SUMMARY

Aspects of the disclosure provide a method. The method can include determining a resource allocation framework for sidelink communication, allocating resources in a resource grid for a physical sidelink control channel (PSCCH), a physical sidelink shared channel (PSSCH), or a physical sidelink frequency channel (PSFCH) based on the resource allocation framework, and transmitting a sub-channel index and a resource block (RB) set index to indicate resource allocation information of the PSCCH, the PSSCH, or the PSFCH over a sidelink unlicensed (SL-U) spectrum, wherein the resource allocation framework comprises at least one SL-U component carrier (CC), the at least one SL-U CC including an SL-U bandwidth part (BWP) that includes X RBs indexed from 0 to X−1, the SL-U BWP being divided into Y resource pools (RPs) indexed from 0 to Y−1 and at least one inter-RP guard band (GB) in response to Y being an integer greater than 1, the at least one inter-RP GB being located between two adjacent RPs, the RBs of each RP being divided into N RB sets indexed from 0 to N−1 and at least one intra-cell GB in response to N being an integer greater than 1, the at least one intra-cell GB being located between two adjacent RB sets, K interlaces indexed from 0 to K−1 in the SL-U BWP, the X RBs being cyclically mapped to the K interlaces, the interlaces being configured per SL-U BWP, and L sub-channels indexed from 0 to L−1 in the RB set, the K interlace being mapped to the L sub-channels in the RB set and L sub-channels cyclically indexed across different RB sets within the resource pool, the sub-channels being configured per RB set.

In an embodiment, each sub-channel is configured to include resources of at least one interlace according to a subcarrier spacing (SCS) in response to the SL transmission being an interlace resource block (IRB) based transmission. In an embodiment, each sub-channel is configured to include resources of a set of contiguous RBs in response to the SL transmission being a contiguous resource block (CRB) transmission. In an embodiment, the sub-channel index is indicated in a bitmap. In an embodiment, the sub-channel index is indicated in a start and length indicator value (SLIV).

In an embodiment, the method can further include allocating, for the PSCCH, resources of one of the sub-channels within a lowest RB set of the corresponding PSSCH. In an embodiment, the method can further include allocating, for the PSCCH, resources of one of the sub-channels within every RB sets of the corresponding PSSCH. In an embodiment, the method can further include allocating, for the PSSCH, resources of one or multiple of the sub-channels within one or multiple RB sets within the resource pool. In an embodiment, the method can further include in response to K=1, allocating, for the PSFCH, resources of at least one interlace being mapped to at least one sub-channel within one RB set by (pre-)configuration. In an embodiment, the method can further include in response to the at least one intra-cell GB and the two adjacent RB sets belonging to a same RP, allocating, for the PSSCH, resources within the at least one intra-cell GB. In an embodiment, the method can further include receiving information of the resource allocation framework for sidelink communication via a system information block (SIB), a radio resource control (RRC), a MAC control element (MAC-CE), or a sidelink control information (SCI). In an embodiment, the number of RBs of a first interlace within one RB set is (pre-)configured to be different from the number of RBs of a second interlace within the same RB set or between different RB sets.

Aspects of the disclosure provide an apparatus comprising circuitry. The circuitry is configured to determine a resource allocation framework for sidelink communication, allocate resources in a resource grid for a PSCCH, a PSSCH, or a PSFCH based on the resource allocation framework, and transmit a sub-channel index and a RB set index to indicate resource allocation information of the PSCCH, the PSSCH, or the PSFCH over a SL-U spectrum, wherein the resource allocation framework comprises at least one SL-U CC, the at least one SL-U CC including an SL-U BWP that includes X RBs indexed from 0 to X−1, the SL-U BWP being divided into Y RPs indexed from 0 to Y−1 and at least one inter-RP GB in response to Y being an integer greater than 1, the at least one inter-RP GB being located between two adjacent RPs, the RBs of each RP being divided into N RB sets indexed from 0 to N−1 and at least one intra-cell GB in response to N being an integer greater than 1, the at least one intra-cell GB being located between two adjacent RB sets, K interlaces indexed from 0 to K−1 in the SL-U BWP, the X RBs being cyclically mapped to the K interlaces, the interlaces being configured per SL-U BWP, and L sub-channels indexed from 0 to L−1 in the RB set, the K interlace being mapped to the L sub-channels in the RB set and L sub-channels cyclically indexed across different RB sets within the resource pool, the sub-channels being configured per RB set.

Aspects of the disclosure provide a non-transitory computer-readable medium storing instructions. The instructions, when executed by a processor, cause the processor to perform the method.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
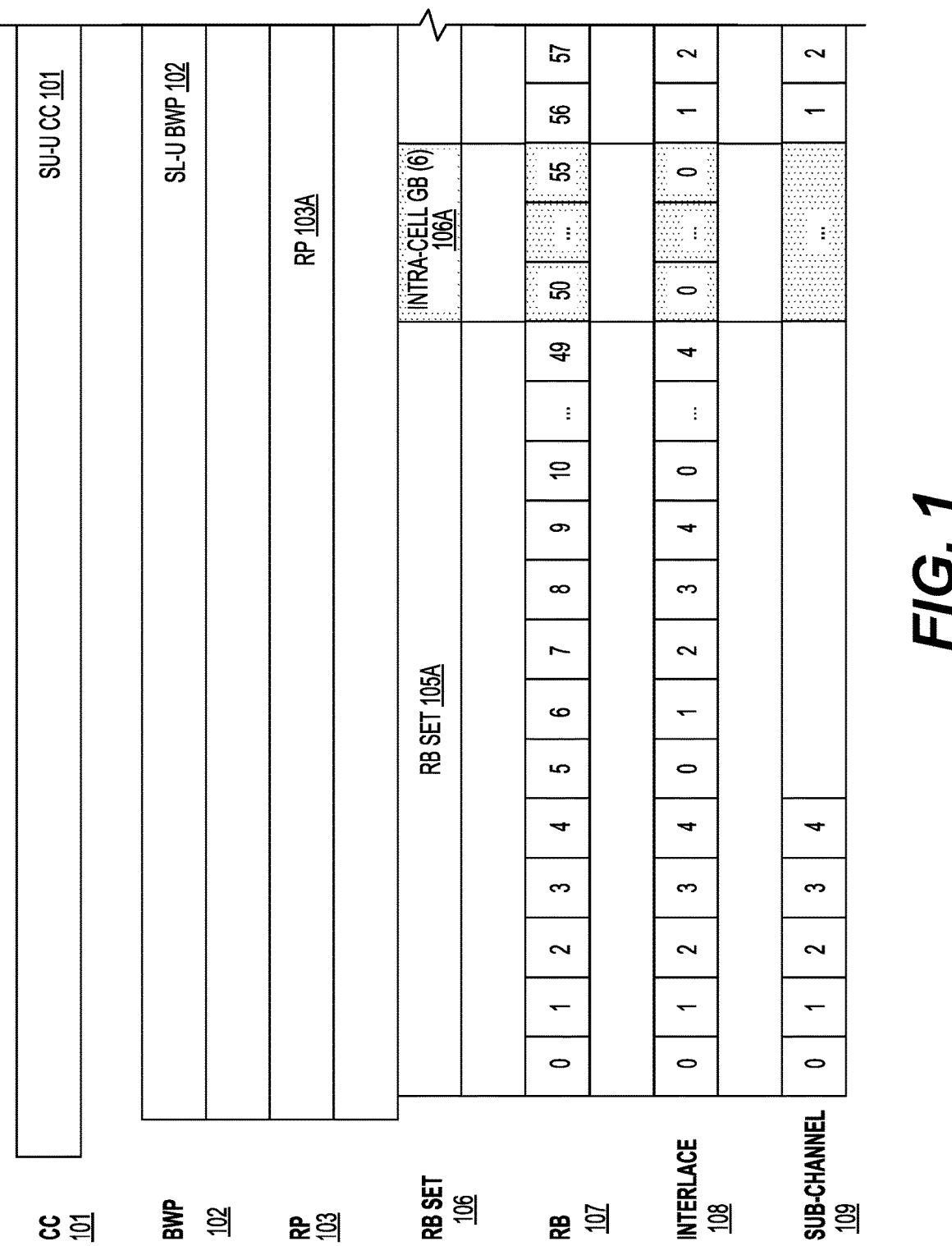
FIG. 1 shows a sidelink-unlicensed (SL-U) frequency grid 100 based on an interlace structure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed upon the overall system.

This invention is motivated by, but not limited to, a scenario where the sidelink is transmitted on unlicensed/shared spectrum. Considering the legacy 5G New Radio Unlicensed (NR-U) and Sidelink (SL) have individual resource allocation frameworks, for Sidelink Unlicensed (SL-U) transmission scenario, one fundamental premise would be the design of the resource allocation framework and method. Therefore, in this disclosure, resource allocation methods for SL-U are proposed.

In this disclosure, SL-U UE can access a single channel on which transmission(s) are performed. Alternatively, the wideband operation can also be supported, which means that SL-U UE can access multiple channels on which transmission(s) are performed. Both contiguous resource block (CRB) based and interlace resource block (IRB) based transmission can be supported for SL-U UE. One sub-channel with new definitions for CRB-based and IRB-based transmissions can be used as the resource allocation granularity of frequency domain via pre-configuration, an indication of System Information Block (SIB), Radio Resource Control (RRC), MAC Control Element (MAC-CE), or Sidelink Control Information (SCI).

For CRB-based transmission, one sub-channel can be defined as N contiguous RBs within one RB set. One sub-channel can also be defined as N contiguous RBs within one listen-before-talk (LBT) channel or bandwidth. The value of N can be pre-configured or indicated by SIB, RRC, or MAC-CE. For example, N can be defined as a value chosen from the set or a sub-set of {1, 2, 3, . . . , 109, 110} under different configurations, such as the numerology, the occupied channel bandwidth (OCB) requirement, the multiplexing mode, the channel occupied time (COT) information, the scheduling information, the configuration of the RBs within the intra-cell guard band if a wideband operation is supported, etc. The number of RBs for different sub-channels can be pre-configured to be the same between the sub-channels or be different between the sub-channels.

For IRB-based transmission, one sub-channel can be defined as K interlaces within one RB set. One sub-channel can also be defined as K interlaces within one LBT channel or bandwidth. The K interlaces can be contiguous, and can also be non-contiguous. The value of K can be pre-configured or indicated by SIB, RRC, or MAC-CE. K can be defined as a value chosen from the set or a sub-set of {1, 2, 3, . . . , 9, 10} under different configurations, such as numerology. For example, the value K can be configured according to the subcarrier spacing (SCS). A 15 kHz SCS can have a K value of 1 or 2. A 30 kHz SCS can have a K value of 1. The number of RBs within different interlaces and/or sub-channels can be pre-configured to be the same between the sub-channels or be different between the sub-channels. The relation between sub-channel and interlace and/or RB can be indicated through a bitmap and/or a start and length indicator value (SLIV).

Alternatively, if channel access procedures for transmissions on multiple LBT channels are supported, the sub-channel can be defined within one RB set or LBT channel, or LBT bandwidth as described above, or across multiple RB sets, LBT channels/bandwidths for both CRB-based and IRB-based transmission. For the case that the sub-channel is defined across multiple RB sets/(LBT) channels/LBT bandwidths, any additional information about the RB sets/(LBT) channels/LBT bandwidths on how the sub-channel is defined should also be pre-configured or indicated. For wideband operation, an intra-cell guard band between two consecutive RB sets/(LBT) channels/LBT bandwidths can be (pre-)configured, and the RBs within the intra-cell guard band can be configured to belong to a resource pool. In this case, the sub-channel can also be pre-configured to include the RBs within the intra-cell guard band.

FIG. 1 shows an SL-U frequency grid 100 based on the interlace structure according to the embodiments of the present disclosure. A SL-U component carrier (CC) 101 can have a bandwidth of 80 MHz, for example. Each SL-U CC 101 includes at least one SL-U bandwidth part (BWP) 102 that can be used for data transmission and reception. The SL-U BWP 102 can be used to allow dynamic adjustment of the bandwidth allocation based on network conditions and service requirements. The SL-U BWP 102 can include multiple resource pools (RPs) 103 and inter-RP guard bands (inter-RP GBs) 104. For example, as shown in FIG. 1, the SL-U BWP 102 includes two RPs 103A and 103B. SL-U BWP 102 also includes an inter-RP GB 104. Each RP 103 can include multiple RB sets 105 and intra-cell GBs 106. For example, as shown in FIG. 1, the RP 103A can include three RB sets (i.e., RB set 105A, 105B, 105C) and two intra-cell GBs (i.e., intra-cell GB 106A and 106B). For another example, the RP 103B can include just one RB set (i.e., RB 105D). Each RB set 105 can include 50 RBs 107 in an example. The intra-cell GBs 106 can have different numbers of RBs 107 in each intra-cell GBs 106. For example, as shown in FIG. 1, intra-cell 106A and intra-cell 106C each have 6 RBs while intra-cell 106B only has 5 RBs.

The RBs 107 are indexed per SL-U BWP. For example, as shown in FIG. 1, RBs 107 have indexes from 0 to 216 for the SL-U BWP 102. In other words, RB set 105A can include RBs with indexes 0~49, RB set 105B can include RBs with indexes 56~105, RB set 105C can include RBs with indexes 111~160, and RB set 105D can include RBs with index 167~216. Intra-cell 106A can include RBs with indexes 50~55, intra-cell 106B can include RBs with indexes 106~110, and intra-cell 106C can include RBs with indexes 161~166.

Interlaces 108 are also configured per SL-U BWP. Each interlace 108 can be configured to map the RBs 107 within the SL-U BWP 102 in a cyclical manner. For example, as shown in FIG. 1, a total of 5 interlaces 108 with indexes 0~4 are used in the SL-U BWP 102 to map RBs. The interlace 108 with index 0 is corresponding to RBs with indexes{0, 5, 10, . . . , 215}. The interlace 108 with index 1 is corresponding to RBs with indexes{1, 6, 11, . . . , 216}. The interlace 108 with index 2 is corresponding to RBs with indexes{2, 7, 12, . . . , 212}. The interlace 108 with index 3 is corresponding to RBs with indexes{3, 8, 13, . . . , 213}. The interlace 108 with index 4 is corresponding to RBs with indexes{4, 9, 14, . . . , 214}.

Sub-channels 109 are configured per RB set and per RP. Each sub-channel 109 can be configured to include one interlace 108. Each sub-channel 109 can also be configured to include multiple interlaces 108. The sub-channel can be indexed from 0 per RP. The sub-channel 109 with index k is mapped to one or multiple (e.g., K) interlaces starting from interlace 108 with index k*K. For example, the sub-channel 109 with index 0 can be mapped to interlace 108 with index 0 and the sub-channel 109 with index 1 can be mapped to interlace 108 with index 1. As shown in FIG. 1, RB set 105A includes 5 sub-channels 109 with indexes from 0~4. The sub-channel 109 with index 0 can be used to map the RBs 107 in interlace 108 with index 0. For another example, the sub-channel 109 with index 0 can be used to map the RBs 107 in interlace 108 with index 0 and interlace 108 with index 1. Since the sub-channel is also configured per RP, the sub-channel index will start from in each RP. The mapping configuration is however consistent across RPs. For example, as shown in FIG. 1, RP 103B has sub-channel 109 with index 0 at the beginning and interlace 108 with index 2 at the beginning, the mapping configuration is the same as in RP 103A, as sub-channel 109 with index 0 maps with interlace 108 with index 0, and so on.

Figure 2:
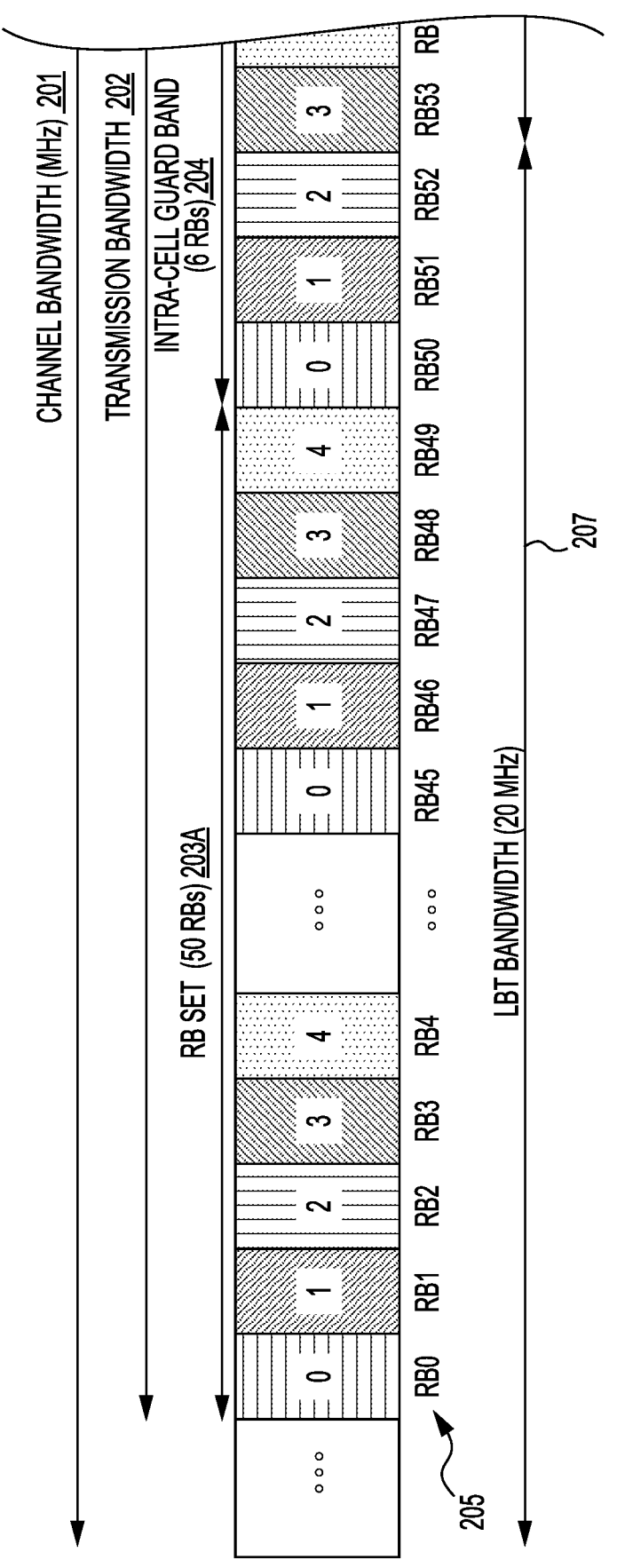
FIG. 2 shows a channel structure 200 for a listen-before-talk (LBT) transmission.
Figure 2:
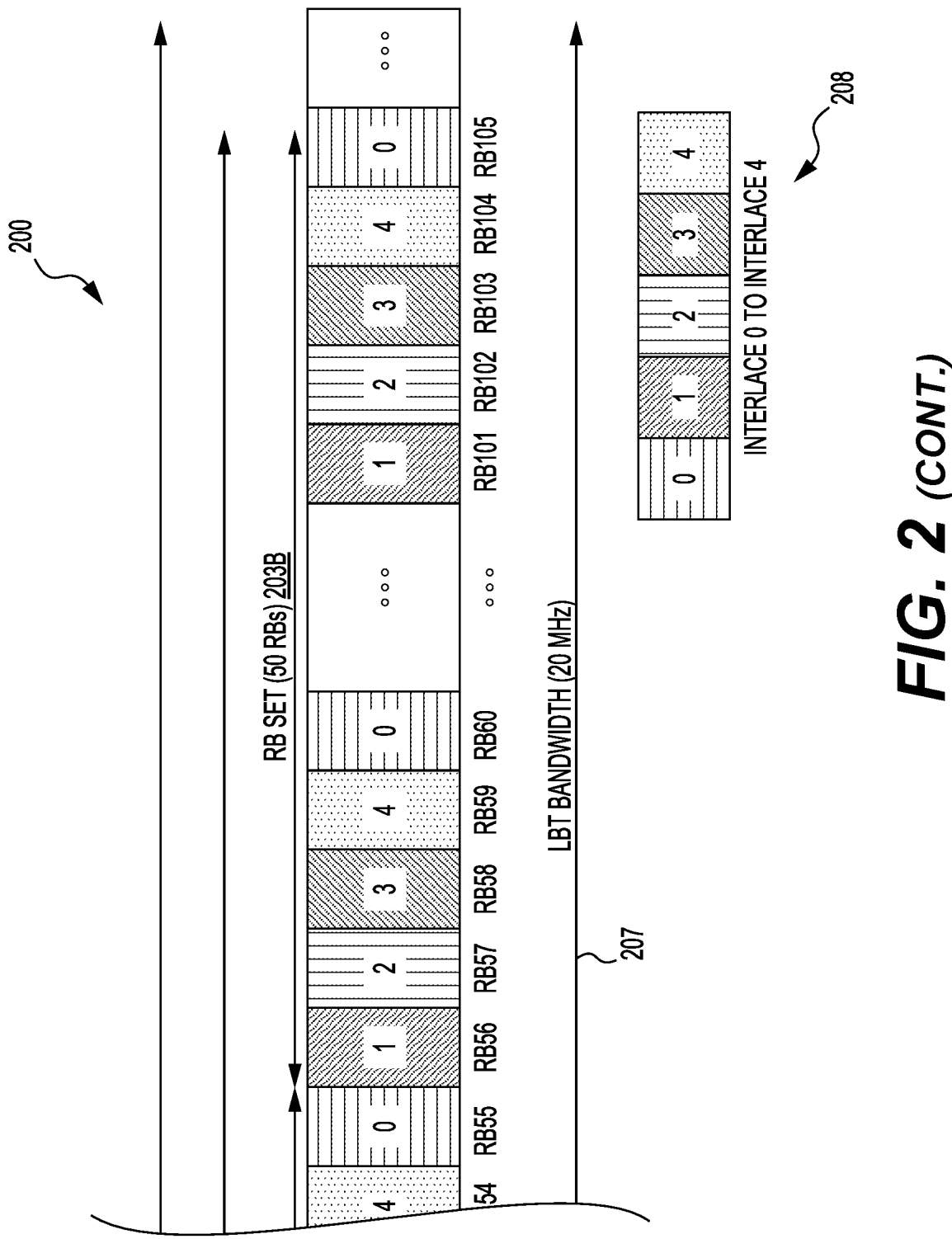

FIG. 2 shows a channel structure 200 for LBT transmission according to the embodiments of the present disclosure. A channel access procedure can be operated on the channel structure 200 for LBT as shown in FIG. 2. A channel bandwidth 201 can include multiple transmission bandwidths 202. The transmission bandwidths 202 can include multiple RB sets 203 (e.g., 203A and 203B) and intra-cell guard bands (e.g., intra-cell guard band 204). The transmission bandwidths 202 can be used for SL-U transmission. The RB sets 203 can be used to transmit control information and data. The intra-cell guard bands 204 can be used to separate two RB sets to avoid interference. As shown in FIG. 2, the channel bandwidth 201 is 40 MHz wide and includes total of 206 RBs 205 (i.e., RB0-RB105). The channel bandwidth 201 is divided into two LBT bandwidths 207 each 20 MHz wide. The LBT bandwidths 207 can be used to avoid interference between multiple UEs sharing the same SL-U spectrum. The transmission bandwidth 201 is further divided into two RB sets 203 (i.e., 203A and 203B) and one intra-cell guard band 204. Each RB set 203 includes 50 RBs. The intra-cell guard band 204 includes 6 RBs. The RBs are also mapped cyclically by total of 5 interlaces 208 with index 0~4. The index number of the interlace can be used to indicate the occupation of the control data and information between UEs in a SL-U transmission. Before the SL-U UE can transmit traffic on the channel bandwidth 201, it performs multiple channel access procedures utilizing the LBT mechanism on the channel bandwidth 201. If the multiple channel access procedures are successful, the SL-U UE can start the CRB-based transmission or IRB-based transmission as configured.

For CRB-based transmission, one sub-channel can be defined as N consecutive RBs within one RB set. The value of N can be configured to include or not include the number of RBs within the intra-cell GB. In some embodiments, one RP can include an intra-cell GB and two adjacent RB sets of the intra-cell GB. For example, if the RBs within the intra-cell GB belong to the RP, the value of N can be configured from the set of {1, 2, . . . , 55, 56}. Otherwise, if the RBs within the intra-cell GB do not belong to the RP, the value of N can be configured from {1, 2, . . . , 49, 50}.

For IRB-based transmission, one sub-channel can be defined as K interlaces within one RB set. For example, as shown in FIG. 2, the value of K can be configured from {1, 2, . . . , 4, 5}. According to the transmission bandwidth configuration, if the interlaces (RBs) within the intra-cell guard band belong to the resource pool, the sub-channel can occupy the interlaces and RBs within the intra-cell guard band. Otherwise, the sub-channel cannot occupy the interlaces or RBs within the intra-cell guard band.

In some embodiments of the present disclosure, the channel access and transmission performed by a UE in the SL-U spectrum can be operated on single or multiple LBT channels. The resources allocated for a Physical Sidelink Control Channel (PSCCH) can be configured to occupy the starting/leading/lowest sub-channel within the starting/leading/lowest RB set of the corresponding PSSCH. For example, refer to FIG. 1, in the case of the corresponding PSSCH of a PSCCH occupying RBs within the RP 103A, the PSCCH can be configured to occupy RBs within the sub-channel 109 with the index 0 within the RB set 105A, since the RB set 105A is the starting/leading/lowest RB set of the RP 103A and the sub-channel 109 with the index 0 is the starting/leading/lowest sub-channel of the RB set 105A. The resources allocated for the PSCCH can also be configured to occupy one sub-channel within every RB set. This can be used to avoid failure in communication between two UEs when the two UEs only have higher RB sets overlapping. The resource allocation configuration for the PSCCH can be pre-configured, or indicated via SIB, RRC, or MAC-CE.

The resources allocated for a Physical Sidelink Shared Channel (PSSCH) can be configured to occupy one sub-channel in any RB set. The resources allocated for PSSCH can also be configured to occupy multiple sub-channels across multiple RB sets. In some embodiments, PSSCH can be configured to occupy the RBs within an intra-cell GB if the intra-cell GB has two adjacent RB sets and are all belongs to one RP. For example, refer to FIG. 1, the intra-cell GB 106A and the intra-cell GB 106B are within RP 103A along with the RB set 105A and 105B. The PSSCH can then occupy the 11 RBs 107 within the intra-cell GB 106A and 106B.

The Resources allocated for Physical Sidelink Feedback Channel (PSFCH) can be configured to occupy one sub-channel within one RB set. The Resources allocated for PSFCH can also be configured to occupy multiple sub-channels within one RB set. The resource allocation configuration for PSFCH can be pre-configured or indicated via SIB, RRC, or SCI under the IRB-based transmission or the CRB-based transmission with the consideration of the OCB requirements. The resource allocation configuration for PSFCH can also be dynamically indicated during transmission to overcome PSFCH transmission dropping in the case of LBT failure. The OCB requirements and power spectral density (PSD) requirements for PSFCH transmission can be achieved with IRB-based transmission for 15 kHz and 30 kHz SCS.

In some embodiments of the present disclosure, a UE can report or transmit the resource allocation configuration, such as the occupation of PSCCH, PSSCH, and PSFCH via SCI. SCI in Sidelink can include a first-stage SCI and a second-stage SCI, the first-stage stage SCI can be used to convey resource allocation information of the sub-channel index and the RB set index. The resource can be indicated through the bitmap and/or SLIV configuration. For example, in the case that the sub-channel is defined within one RB set, the SCI can be configured to include a sub-channel indicator/index and an RB set indicator/index. The SCI can also be configured to just include a sub-channel indicator/index or just an RB set indicator/index. The sub-channel indicator/index can be configured to include the information of the allocated sub-channels, such as the number of allocated sub-channels, the indexes of the allocated sub-channels, and the length of one allocated sub-channel if the transmission is CRB-based.

The RB set indicator/index can be configured to include the information of the allocated RB sets, such as the start position of the first allocated RB set, the indexes of the allocated RB sets, the length of the allocated RB sets, and the number of the allocated RB sets. For another example, in the case that the sub-channel is defined across multiple RB sets, the SCI can be configured to include the sub-channel indicator/index, for example, the number of allocated sub-channels, the indexes of the allocated sub-channels, and/or the length of one allocated sub-channel if the transmission is CRB-based. The resource allocation indicator/index can be multiplexed with the existing resource allocation filed in legacy SCI. In some embodiments, the resource being indicated through SLIV configuration can be detailed further in the frequency resource indication value (FRIV) in the frequency domain and detailed further in the time resource indication value (TRIV) in the time domain.

In some embodiments of the present disclosure, a COT initiator can be configured to occupy (a sub-set of) (multiple) RB set(s) in the leading/beginning position of the COT information. The COT information can be used by the COT initiator or shared by the COT initiator with other SL-U UEs in Time Division Multiplexing (TDM) or Frequency Division Multiplexing (FDM) modes as pre-configured. In the case that an OCB requirement need be satisfied, if TDM mode is adopted, IRB-based transmission can be configured as a default way and CRB can only be used if it can satisfy the OCB requirements. If FDM mode is adopted, both IRB-based and CRB-based transmission can be used as pre-configured. In the case that the OCB requirements do not need to be satisfied, both IRB-based and CRB-based transmission can be used for both TDM and FDM modes as pre-configured.

After a successful LBT, the COT initiator can share the COT with the other UEs. The COT sharing UEs can be (pre-)configured to transmit packets with or without PSCCH. For the PSCCH transmitted from each COT sharing UE, the COT initiator can be configured to monitor the PSCCH at (multiple) (pre-)configured starting/leading sub-channel(s) and/or (multiple) (pre-) configured fixed sub-channel(s) within (multiple) (pre-)configured starting/leading RB set(s) and/or (multiple) (pre-)configured fixed RB set(s) within the corresponding allocated resource for each COT sharing UE.

Figure 3:
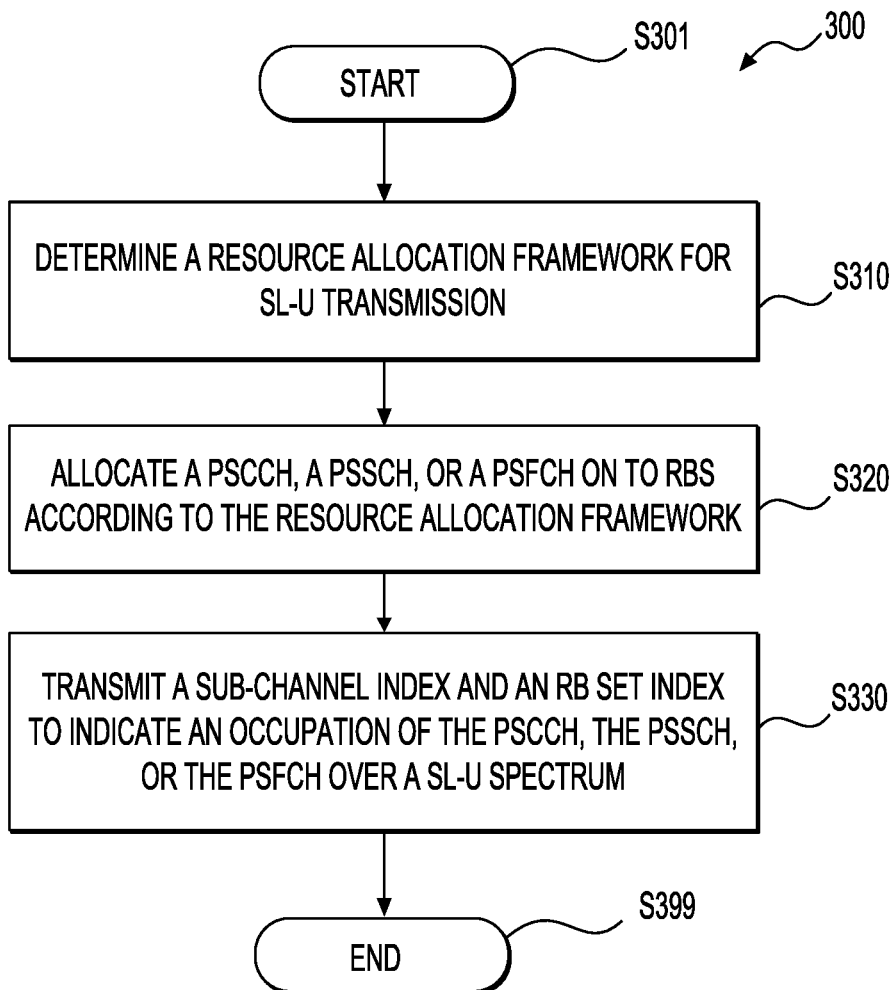
FIG. 3 shows a process 300 of wireless communication through the SL-U spectrum according to an embodiment of the present disclosure.

FIG. 3 shows a process 300 of wireless communication through the SL-U spectrum according to an embodiment of the present disclosure. The process 300 can start from step S301 and proceed to step S310.

At step S310, A first UE determines a resource allocation framework that is used for SL-U transmission. For example, the resource allocation framework can include at least one SL-U component carrier (CC) which includes an SL-U bandwidth part (BWP) that includes multiple resource blocks (RBs) for the transmission of control information and data. The RBs within the SL-U BWP can be divided into multiple resource pools (RPs) and multiple inter-RP guard bands (GPs). Each RP can further divide the RBs into RB sets and intra-cell GB s, where the RB sets are indexed. The resource allocation framework can further include a inter-lace structure that include indexed interlaces which are configured to map the RBs cyclically within the SL-U BWP. The resource allocation framework can further include a sub-channel structure per RB set that include indexed sub-channels which are configured to map the RBs within an RB set.

At step S320, the first UE occupies a PSCCH, a PSSCH, or a PSFCH on to an RB according to the resource allocation framework. For example, the first UE can occupy a PSCCH in the starting/leading/lowest sub-channel within the starting/leading/lowest RB set of a corresponding PSSCH. For example, the first UE can occupy a PSCCH in one sub-channel within every RB set. For example, the first UE can occupy a PSSCH in one sub-channel in any RB set. For example, the first UE can occupy a PSSCH in multiple sub-channels across multiple RB sets. For example, the first UE can occupy a PSSCH in the RBs within an intra-cell GB if the intra-cell GB has two adjacent RB sets and are all belongs to one RP. For example, the first UE can occupy a PSFCH in one sub-channel within one RB set. For example, the first UE can occupy a PSFCH in multiple sub-channels within one RB set.

At step S330, the first UE transmits a sub-channel index and an RB set index to indicate an occupation of a PSCCH, a PSSCH, or a PSFCH over a SL-U spectrum to a second UE. For example, the first UE can transmit a sub-channel index and an RB set index to indicate the occupation of a PSCCH. For example, the first UE can transmit a sub-channel index and an RB set index to indicate the occupation of a PSSCH. For example, the first UE can transmit a sub-channel index and an RB set index to indicate the occupation of a PSFCH. The process 300 can proceed to S399 and terminate at S399.

Figure 4:
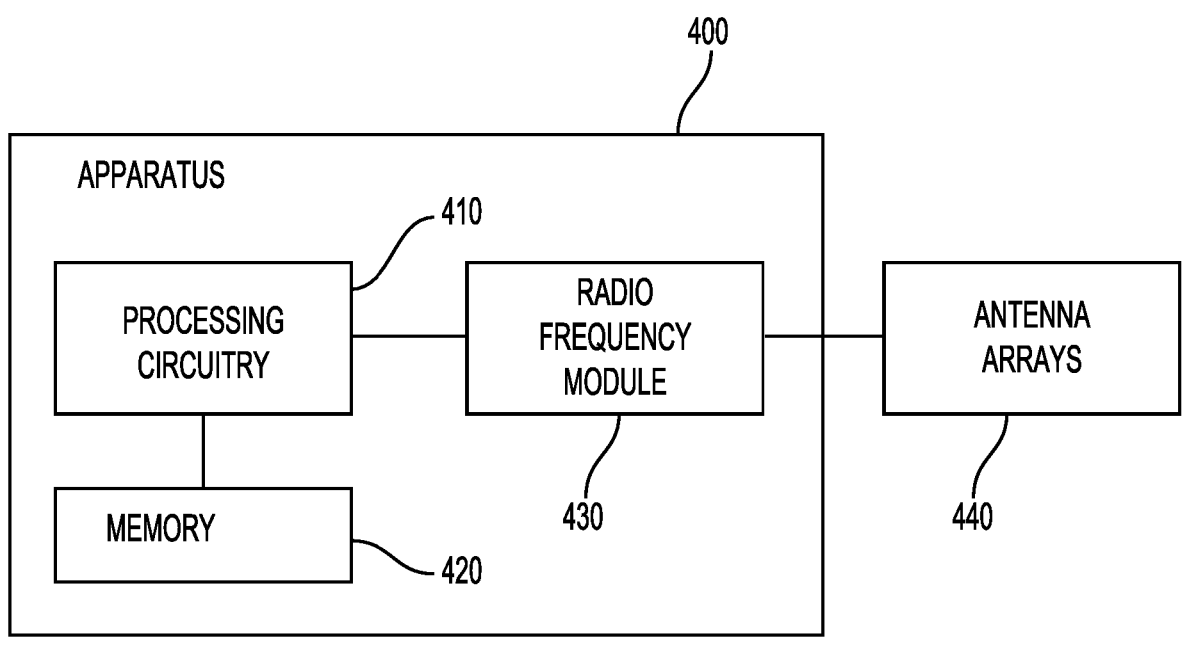
FIG. 4 shows an exemplary apparatus 400 according to embodiments of the Disclosure.

FIG. 4 shows an exemplary apparatus 400 according to embodiments of the disclosure. The apparatus 400 can be configured to perform various functions in accordance with one or more embodiments or examples described herein. Thus, the apparatus 400 can provide means for implementation of mechanisms, techniques, processes, functions, components, systems described herein. For example, the apparatus 400 can be used to implement functions of UEs or BS s in various embodiments and examples described herein. The apparatus 400 can include a general purpose processor or specially designed circuits to implement various functions, components, or processes described herein in various embodiments. The apparatus 400 can include processing circuitry 410, a memory 420, and a radio frequency (RF) module 430.

In various examples, the processing circuitry 410 can include circuitry configured to perform the functions and processes described herein in combination with software or without software. In various examples, the processing circuitry 410 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 410 can be a central processing unit (CPU) configured to execute program instructions to perform various functions and processes described herein. Accordingly, the memory 420 can be configured to store program instructions. The processing circuitry 410, when executing the program instructions, can perform the functions and processes. The memory 420 can further store other programs or data, such as operating systems, application programs, and the like. The memory 420 can include non-transitory storage media, such as a read only memory (ROM), a random access memory (RAM), a flash memory, a solid state memory, a hard disk drive, an optical disk drive, and the like.

In an embodiment, the RF module 430 receives a processed data signal from the processing circuitry 410 and converts the data signal to beamforming wireless signals that are then transmitted via antenna arrays 440, or vice versa. The RF module 430 can include a digital to analog converter (DAC), an analog to digital converter (ADC), a frequency up converter, a frequency down converter, filters and amplifiers for reception and transmission operations. The RF module 430 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 440 can include one or more antenna arrays.

The apparatus 400 can optionally include other components, such as input and output devices, additional or signal processing circuitry, and the like. Accordingly, the apparatus 400 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   determining a resource allocation framework for sidelink communication;
   allocating resources in a resource grid for a physical sidelink control channel (PSCCH), a physical sidelink shared channel (PSSCH), or a physical sidelink frequency channel (PSFCH) based on the resource allocation framework; and
   transmitting at least one sub-channel index and at least one resource block (RB) set index to indicate resource allocation information of the PSCCH, the PSSCH, or the PSFCH over a sidelink unlicensed (SL-U) spectrum, wherein the resource allocation framework comprises:
   at least one SL-U component carrier (CC), the at least one SL-U CC including an SL-U bandwidth part (BWP) that includes X RBs indexed from 0 to X−1, the SL-U BWP being divided into Y resource pools (RPs) indexed from 0 to Y−1 and at least one inter-RP guard band (GB) in response to Y being an integer greater than 1, the at least one inter-RP GB being located between two adjacent RPs, the RBs of each RP being divided into N RB sets indexed from 0 to N−1 and at least one intra-cell GB in response to N being an integer greater than 1, the at least one intra-cell GB being located between two adjacent RB sets;
   K interlaces indexed from 0 to K−1 in the SL-U BWP, the X RBs being cyclically mapped to the K interlaces, the interlaces being configured per SL-U BWP; and
   L sub-channels indexed from 0 to L−1 in the RB set, the K interlace being mapped to the L sub-channels in the RB set and L sub-channels cyclically indexed across different RB sets within the resource pool, the sub-channels being configured per RB set.

2. The method of claim 1, wherein each sub-channel is configured to include resources of at least one interlace according to a subcarrier spacing (SCS) in response to the SL transmission being an interlace resource block (IRB) based transmission.

3. The method of claim 1, wherein each sub-channel is configured to include resources of a set of contiguous RBs in response to the SL transmission being a contiguous resource block (CRB) transmission.

4. The method of claim 1, wherein the at least one sub-channel index is indicated in a bitmap.

5. The method of claim 1, wherein the at least one sub-channel index is indicated in a start and length indicator value (SLIV).

6. The method of claim 1, wherein the at least one RB set index is indicated in a start and length indicator value (SLIV).

7. The method of claim 1, further comprising:

allocating, for the PSCCH, resources of a lowest sub-channel within a lowest RB set of the corresponding PSSCH.

8. The method of claim 1, further comprising:

allocating, for the PSCCH, resources of a lowest sub-channel within every RB sets of the corresponding PSSCH.

9. The method of claim 1, further comprising:

allocating, for the PSSCH, resources of one or multiple of the sub-channels within one or multiple RB sets within the resource pool.

10. The method of claim 1, further comprising:

in response to K=1, allocating, for the PSFCH, resources of at least one interlace being mapped to at least one sub-channel within at least one RB set by (pre-)configuration.

11. The method of claim 1, further comprising:

in response to the at least one intra-cell GB and the two adjacent RB sets belonging to a same RP and the two adjacent RB sets are used for PSSCH transmission, allocating, for the PSSCH, resources within the at least one intra-cell GB.

12. The method of claim 1, wherein the determining comprises:

receiving information of the resource allocation framework for sidelink communication via a system information block (SIB), a radio resource control (RRC), a MAC control element (MAC-CE), or a sidelink control information (SCI).

13. The method of claim 1, wherein the number of RBs of a first interlace within one RB set is (pre-) configured to be same or different from the number of RBs of a second interlace within the same RB set or between different RB sets.

14. An apparatus, comprising a radio frequency module that transmits and receives radio frequency (RF) signal in a wireless network;

a memory, and a processing circuitry coupled to the memory, the processing circuitry configured to:

determine a resource allocation framework for sidelink communication;

allocate resources in a resource grid for a physical sidelink control channel (PSCCH), a physical sidelink shared channel (PSSCH), or a physical sidelink frequency channel (PSFCH) based on the resource allocation framework; and transmit at least one sub-channel index and at least one resource block (RB) set index to indicate resource allocation information of the PSCCH, the PSSCH, or the PSFCH over a sidelink unlicensed (SL-U) spectrum, wherein the resource allocation framework comprises:

at least one SL-U component carrier (CC), the at least one SL-U CC including an SL-U bandwidth part (BWP) that includes X RBs indexed from 0 to X−1, the SL-U BWP being divided into Y resource pools (RPs) indexed from 0 to Y−1 and at least one inter-RP guard band (GB) in response to Y being an integer greater than 1, the at least one inter-RP GB being located between two adjacent RPs, the RBs of each RP being divided into N RB sets indexed from 0 to N−1 and at least one intra-cell GB in response to N being an integer greater than 1, the at least one intra-cell GB being located between two adjacent RB sets;

K interlaces indexed from 0 to K−1 in the SL-U BWP, the X RBs being cyclically mapped to the K interlaces, the interlaces being configured per SL-U BWP; and L sub-channels indexed from 0 to L−1 in the RB set, the K interlace being mapped to the L sub-channels in the RB set and L sub-channels cyclically indexed across different RB sets within the resource pool, the sub-channels being configured per RB set.

15. The apparatus of claim 14, wherein each sub-channel is configured to include resources of at least one interlace according to a subcarrier spacing (SCS) in response to the SL transmission being an interlace resource block (IRB) based transmission.

16. The apparatus of claim 14, wherein each sub-channel is configured to include resources of a set of contiguous RBs in response to the SL transmission being a contiguous resource block (CRB) transmission.

17. The apparatus of claim 14, wherein the processing circuitry is further configured to: allocate, for the PSCCH, resources of a lowest sub-channel within a lowest RB set of the corresponding PSSCH.

18. The apparatus of claim 14, wherein the processing circuitry is further configured to: allocate, the PSCCH, resources of a lowest sub-channel within every RB sets of the corresponding PSSCH.

19. The apparatus of claim 14, wherein the processing circuitry is further configured to: in response to K=1, allocate, for the PSFCH, resources of at least one interlace being mapped to at least one sub-channel within at least one RB set by configuration.

20. A non-transitory computer-readable medium storing instructions that, when executed by a processor, cause the processor to perform a method, the method comprising:

determining a resource allocation framework for sidelink communication;

allocating resources in a resource grid for a physical sidelink control channel (PSCCH), a physical sidelink shared channel (PSSCH), or a physical sidelink frequency channel (PSFCH) based on the resource allocation framework; and transmitting at least one sub-channel index and at least one resource block (RB) set index to indicate resource allocation information of the PSCCH, the PSSCH, or the PSFCH over a sidelink unlicensed (SL-U) spectrum, wherein the resource allocation framework comprises:

at least one SL-U component carrier (CC), the at least one SL-U CC including an SL-U bandwidth part (BWP) that includes X RBs indexed from 0 to X−1, the SL-U BWP being divided into Y resource pools (RPs) indexed from 0 to Y−1 and at least one inter-RP guard band (GB) in response to Y being an integer greater than 1, the at least one inter-RP GB being located between two adjacent RPs, the RBs of each RP being divided into N RB sets indexed from 0 to N−1 and at least one intra-cell GB in response to N being an integer greater than 1, the at least one intra-cell GB being located between two adjacent RB sets;

K interlaces indexed from 0 to K−1 in the SL-U BWP, the X RBs being cyclically mapped to the K interlaces, the interlaces being configured per SL-U BWP; and L sub-channels indexed from 0 to L−1 in the RB set, the K interlace being mapped to the L sub-channels in the RB set and L sub-channels cyclically indexed across different RB sets within the resource pool, the sub-channels being configured per RB set.

* * * * *